March 26, 1946.  L. R. TANSLEY  2,397,446
APPARATUS FOR REFRIGERATING COMESTIBLES
Filed Sept. 28, 1942  4 Sheets-Sheet 1
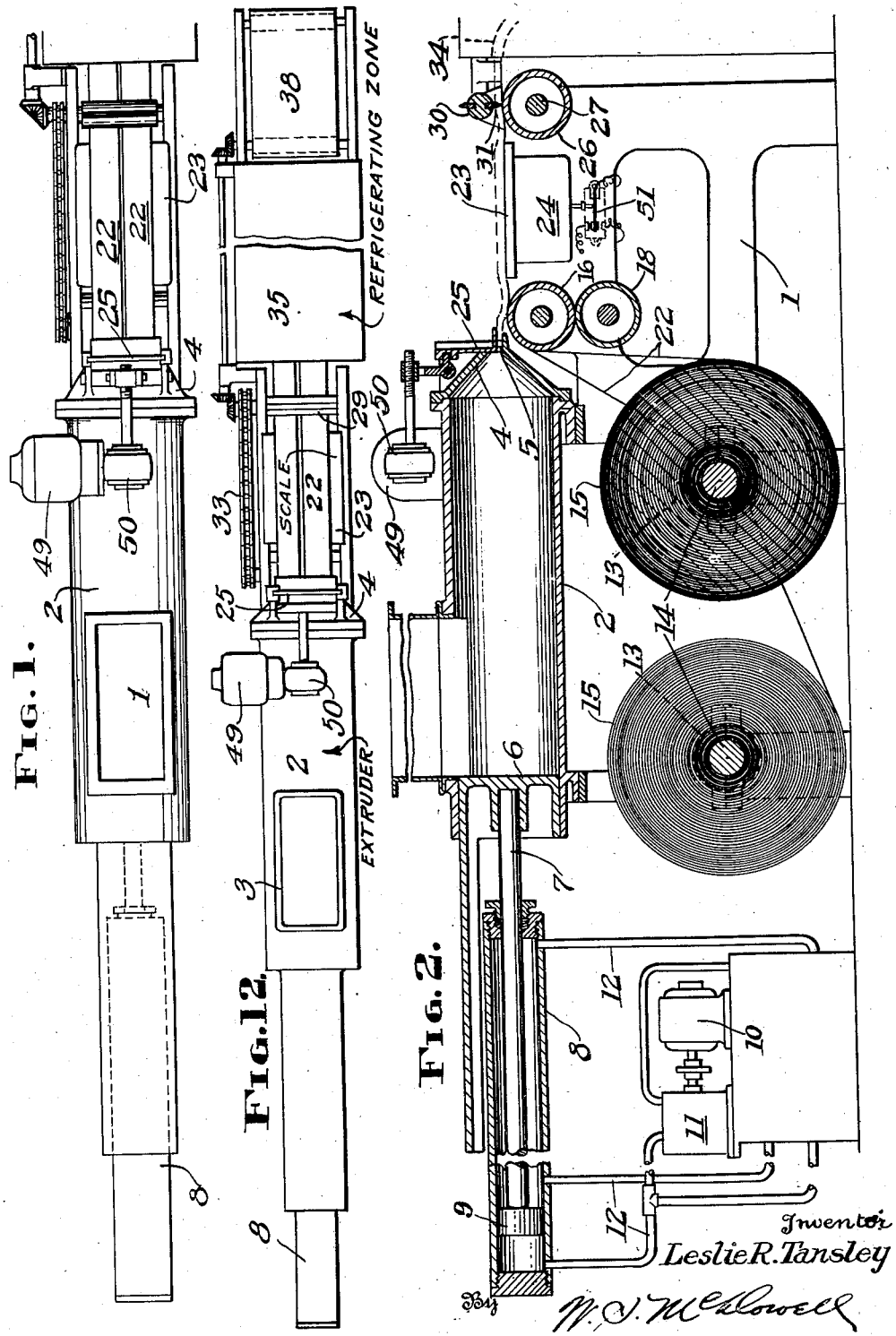
Inventor
Leslie R. Tansley

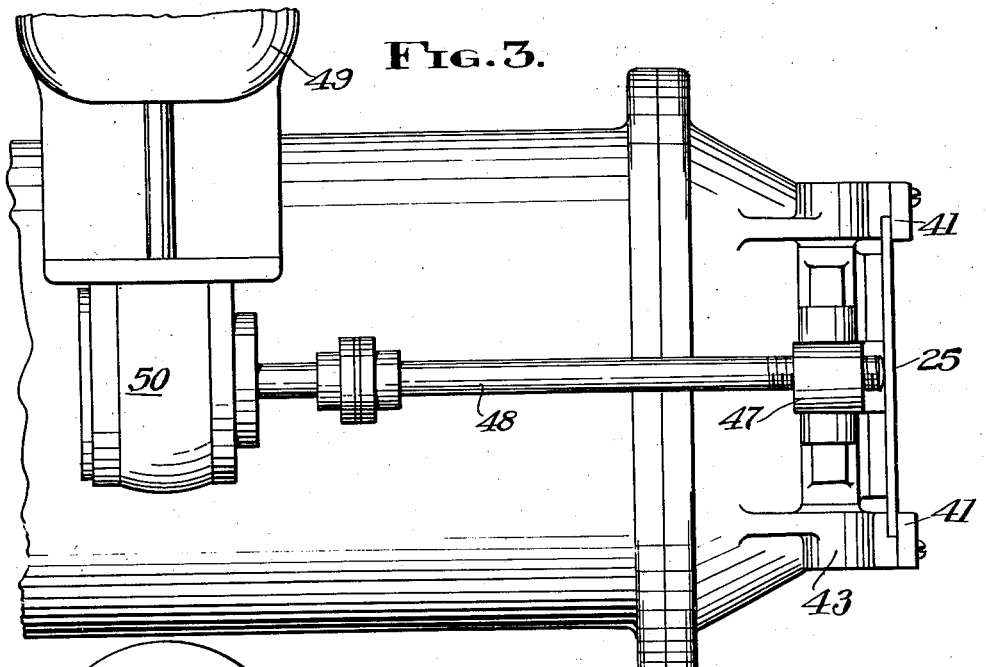
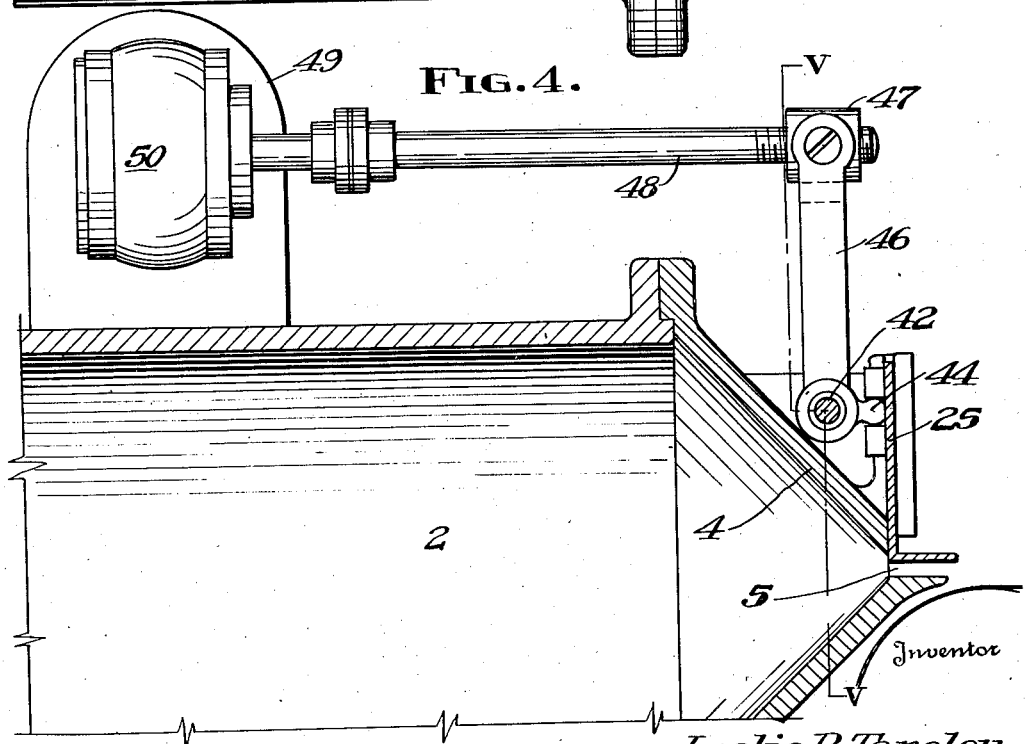

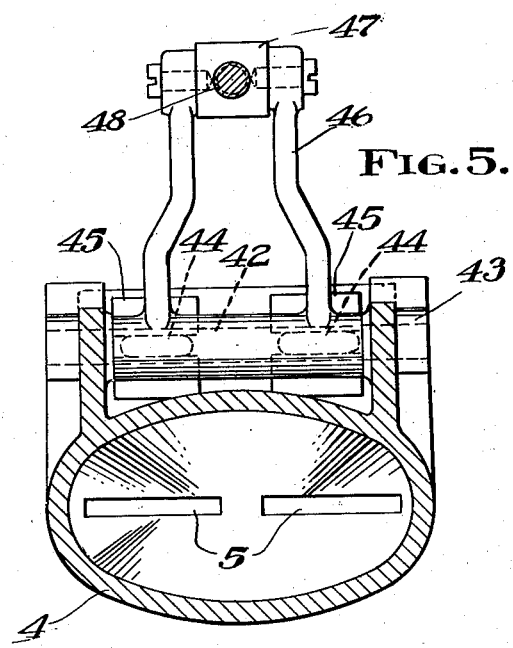
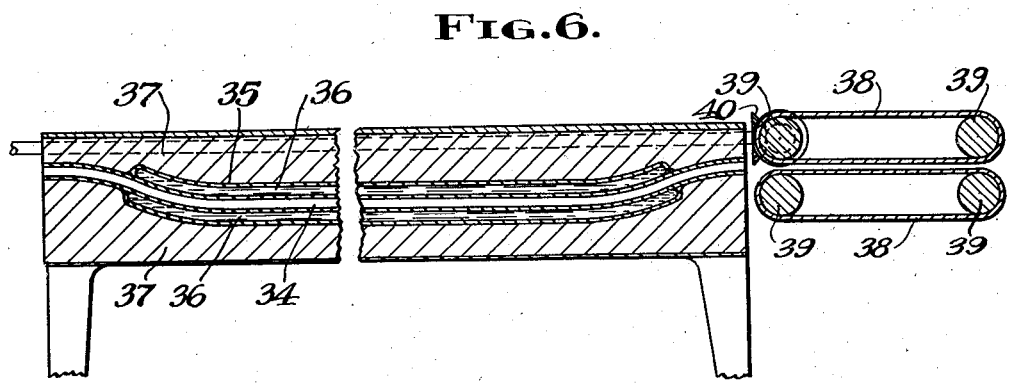

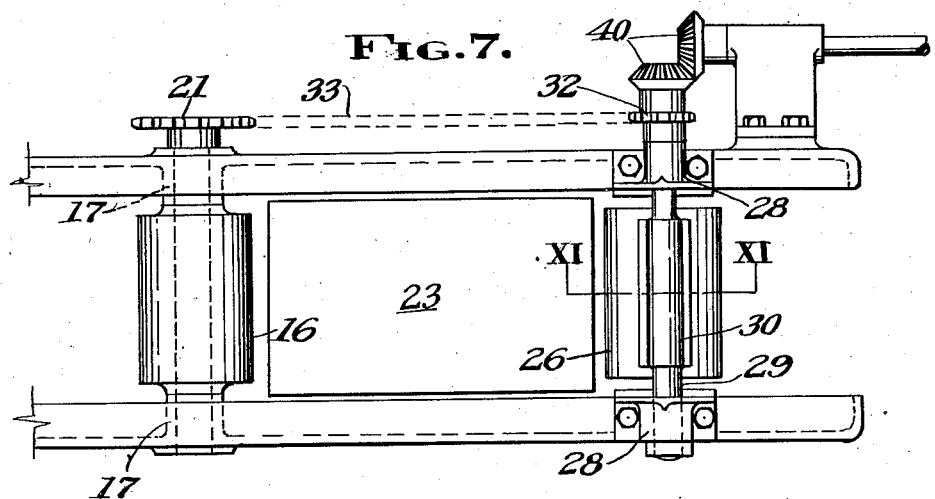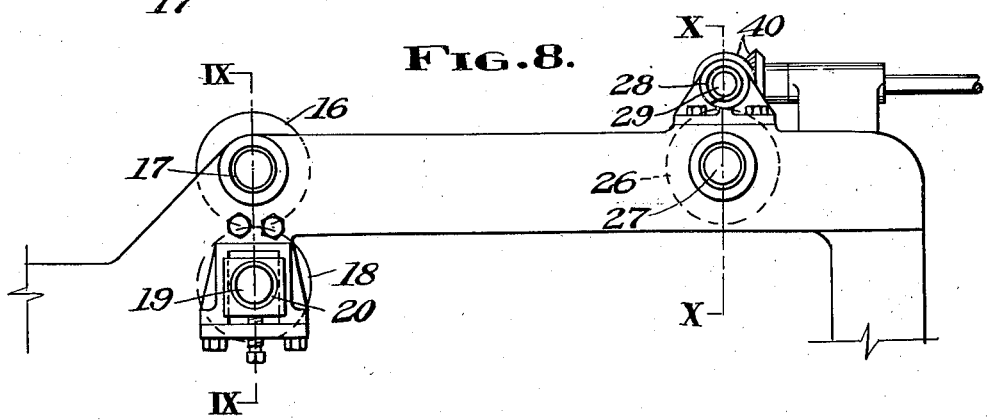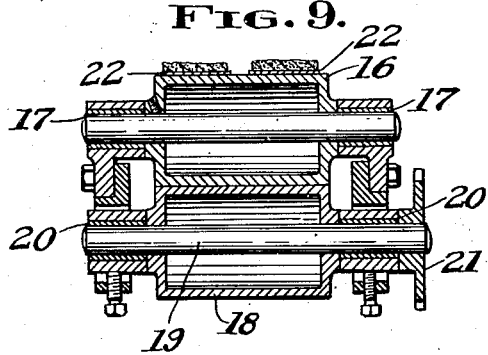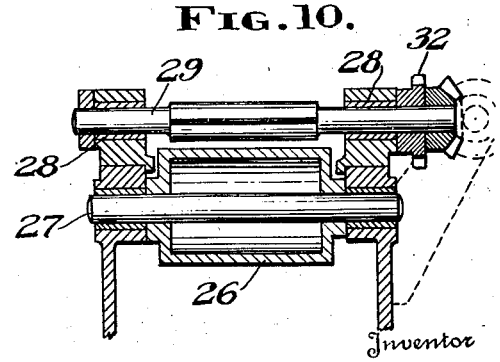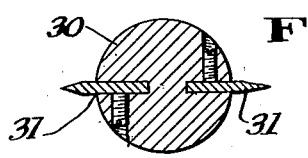

Patented Mar. 26, 1946

2,397,446

UNITED STATES PATENT OFFICE 2,397,446

APPARATUS FOR REFRIGERATING COMESTIBLES

Leslie R. Tansley, Columbus, Ohio, assignor to White Castle System, Inc., Columbus, Ohio, a corporation of Delaware Application September 28, 1942, Serial No. 459,954

1 Claim. (Cl. 17—32)

This invention relates to the art of forming, preparing and refrigerating comestible products to adapt the same for handling, storage and commercial utilization. In a more specific aspect, the invention is directed particularly to means for forming refrigerated strips, cakes or pats of ground meat.

While my invention is applicable to the preparation of many different kinds of comestibles, it has been developed particularly for the preparation of ground meat products, such as hamburger meats, in order to preserve and adapt the same for commercial purposes.

In restaurants specializing in the sale of hamburger sandwiches in large quantities, considerable difficulty has been encountered in protecting fresh meats against deterioration or contamination and, also, in the matter of producing cakes or pats of such meats having uniform weight and general proportions. Usually, selected meats are ground and maintained under ordinary refrigerating conditions. The meat patties are prepared by hand, that is shaped and weighed and deposited on strips of parchment or other paper for use by the chefs. As a result, there is considerable spoilage and waste of the prepared meats, together with variations in the size and weight of the individual meat cakes or pats, resulting in loss to the restaurant owners as well as preventing patrons of such restaurants from receiving sandwiches in which the meat cakes or pats are of uniform weight.

An object, therefore, of the present invention resides in the rapid production of deeply frozen hamburger meat cakes or pats having uniform dimensional and weight values.

Another object is to provide mechanism for extruding ground meat in the form of a strip and wherein such extruded meat strips are deposited on linearly moving ribbons of paper for advancement through a longitudinal refrigerating chamber, in which latter the meat strips are rapidly frozen to sub-zero temperatures for complete preservation until utilized.

A further object resides in the provision of means for weighing the extruded meat strips as the latter are being advanced on the paper ribbons between the extrusion and refrigerating instrumentalities.

Still a further object resides in the provision of mechanism for varying the effective area of the strip outlet of the meat extruding appliance, this being accomplished in an automatic manner governed by the operation of the weighing scale, so that regardless of the variations in the density of the meat strips, the weight of each finally formed cake or pat thereof will be of a uniform value.

A further specific object of the invention is the provision of means disposed in advance of the refrigerating chamber for scoring or severing the meat strip at longitudinal intervals to produce cakes or pats of uniform size.

In carrying out the invention, there is utilized a cylinder into which previously ground meat is introduced. In this cylinder, there is slidably mounted a suitably operated piston or ram which forces the meat toward the forward end of the cylinder. At this end of the cylinder, there is provided a conical extruding head having one or more shaping slots or orifices and through which the meat is forced by the piston or ram so that, following emergence from such slots or outlets, the meat possesses the form of a flat compact strip.

Beneath the outlet or outlets of the extrusion cylinder, the frame of the machine is provided with rolls and guides by means of which one or more ribbons of paper is advanced beneath the outlet of the extrusion cylinder so that as the meat emerges in strip form from said cylinder, the same is deposited on the ribbon or ribbons of paper for movement in unison therewith. As the ribbon of paper advances from the extrusion cylinder, the same rests upon and is passed over the platform of a weighing scale. The scale platform is coupled with a thermionic tube circuit, which governs the operation of a reversible electric motor, the latter being employed to actuate a movable gauge means forming a part of the outlet of the extrusion cylinder, so that if the weight of the meat strip passing over the scale should be below a predetermined value, said motor will be energized to cause the gauge means to enlarge the effective area of said outlet. Conversely, if the weight of the meat strip passing over the scale platform should be in excess of said predetermined value, the motor is operated to move the gauge means to a position diminishing the previous area of the extruding cylinder outlet whereby, through such means, the weight of the meat strip and the cakes or pats formed therefrom may be kept uniform through the operation of automatically functioning means.

Following the weighing operation, through the continued longitudinal movement of the paper ribbon on which the meat strip is supported, the latter is brought into registration with a rotating cutter or scoring instrumentality supported by the frame of the machine. This instrumentality acts to sever the meat strip into cakes or pats of predetermined length, or to deeply score the same at longitudinal intervals, so that cakes or pats may be readily removed from the strip in the event the severing operation is not entirely completed by said instrumentality. Thereafter, without interruption in its longitudinal movement, the paper ribbon on which the severed meat cakes or pats are supported, is advanced through an elongated refrigerating chamber or tunnel. In this chamber or tunnel, which is maintained at sub-zero temperatures, the meat is quickly or instantaneously frozen in a manner analogous to rapidly freezing of other comestible products, such as fish, vegetables and fruits and which methods serve to retain the freshness of the frozen products indefinitely pending their utilization. The frozen meat cakes or pats, while still retained on the paper ribbons, may then be packed in suitable packages or cartons while maintained under refrigerating temperatures and, when needed, so delivered to different restaurants or homes for final usage.

Having thus generally described the apparatus used in the development of the present invention, reference is now to be had to the accompanying drawings, which illustrate a single preferred embodiment of apparatus which I have used in carrying out my invention.

In said drawings:

Fig. 1 is a top plan view of the apparatus;

Fig. 2 is a view partly in vertical longitudinal section and in side elevation of the apparatus;

Fig. 3 is an enlarged plan view showing the outlet end of the extrusion cylinder and illustrating more fully the adjustable gauge for varying the height or thickness of the extrusion outlet and the operating mechanism therefor.

Fig. 4 is a vertical longitudinal sectional view taken through the extrusion cylinder and disclosing the adjustable gauge for the outlet thereof and its operating mechanism;

Fig. 5 is a vertical transverse sectional view taken on the plane indicated by the line V—V of Fig. 4;

Fig. 6 is a vertical longitudinal sectional view taken through the refrigerating unit of the apparatus;

Fig. 7 is a plan view disclosing the guide means for the paper ribbon and the rotatable meat strip scoring or severing device;

Fig. 8 is a side elevational view of the apparatus illustrated in Fig. 7;

Fig. 9 is a vertical transverse sectional view taken on the line IX—IX of Fig. 8;

Fig. 10 is a similar view on the line X—X of Fig. 8;

Fig. 11 is a transverse sectional view on the line XI—XI of Fig. 7;

Fig. 12 is a top plan view of the entire mechanism.

As shown particularly in Fig. 2 of the drawings, the apparatus comprises a base frame shown at 1 on which is supported a hollow extrusion cylinder 2. Previously ground meat is introduced into the cylinder by way of the tubular inlet extension indicated at 3. At its forward end, the cylinder 2 is provided with a tapering, substantially conical head 4 of funnel-like configuration having the center or apex portion thereof formed with one or more outlets 5 of slot-like form.

To advance the ground meat introduced into the cylinder toward the head 4 and cause the meats to be forcibly ejected from the outlet or outlets in strip-like form, the interior of the cylinder is provided with a sliding piston or ram 6. The latter may be operated in any suitable manner as by providing the same with a rod 7 which extends into a ram cylinder 8. Within the cylinder 8, the rod 7 is equipped with a piston 9 and a fluid, either air or liquid, is admitted into the ends of said cylinder under a pressure valve regulation to advance or retract the piston 9 in the cylinder 8. In this regard, an electric motor 10 operates a rotary pump or compressor 11 and pipe lines 12 are associated with said pump or compressor and with the cylinder 8 to govern the advance and retraction of the piston 9 therein and the simultaneous advance and retraction of the piston or ram 6 of the extrusion cylinder 2.

Supported by the base frame 1 are bearings 13 for the reception of shafts 14 which effect the removable support of a pair of paper rolls 15, a pair of such rolls having been illustrated herein although it will be understood that one or more rolls may be employed, depending upon the number of extrusion outlets in the head 4 of the cylinder 2, or the number of extrusion cylinders used. Paper in ribbon form is removed from the rolls 15 and is suitably guided over a drum 16 rotatably journaled in connection with the frame 1 as indicated at 17. The under side of the drum 16 engages with a driving drum 18, the latter being fixed to a shaft 19 journaled transversely of the frame 1 in bearings 20. One end of the shaft 19 is equipped with a sprocket wheel 21 by means of which power may be imparted to the drum 18 and to thereby effect the rotation of the drum 16. The drum 16 is located in registration with and immediately below the outlet slots 5 of the extrusion head 4 so that the strips of extruded meat issuing from the adjacent slots 5 will be positioned upon a pair of paper ribbons 22 withdrawn from the rolls 15.

By contact with the drum 16 and through additional means to be later described, the paper ribbons with the meat strips superposed thereon are advanced in parallel longitudinal relationship across the platform 23 of a weighing scale 24. There is sufficient sag in the ribbons during the passage thereof in contact with the platform 23 to apply the weight of the strips in a limited length thereof to the platform of the scale so that the latter will be responsive to variations in weight of the meat strips to control the automatic operation of an adjustable gauge 25 which is carried by the head 4 and is used to vary the height dimension or area of each of the outlet slots 5.

After passing over the platform 23 of the weighing scale, the ribbons with the meat strips thereon are passed over a drum 26, which is rotatably supported on a shaft 27 carried by the frame 1. Above the drum 26 and in vertical registration therewith, there is rotatably journaled in bearings 28 carried by the frame 1 a shaft 29. This shaft is provided with a thickened portion 30 between its ends which is slotted to receive a plurality of scoring or severing blades 31. As the shaft 29 rotates, the blades 31 engage with the meat strips moving longitudinally over the drum 26. The blades 31 are set so as to virtually sever the meat strips at definite longitudinal intervals, but do not cut or sever the paper ribbons on which the meat strips are supported. The shaft 27 is driven by having fixed on one end thereof a sprocket 32 over which passes an endless chain 33, the latter leading to the sprocket wheel 21 of the driving drum 18.

Following passage through the rotatable scoring device, the paper ribbons with the scored or severed meat strips thereon are advanced into a refrigerating chamber or tunnel 34, the latter being formed in a casing 35 containing refrigerant circulating chambers 36 which are disposed on each side of the tunnel 34, the walls of the tunnel being formed from a good heat conductor such as aluminum or copper. Any suitable refrigerating mechanism may be used for effecting the circulation of the refrigerant through the chambers 36 so that the temperature within the tunnel 34 may be maintained at any suitable degree of cold, usually 30° to 50° below zero Fahrenheit. The walls of the casing 35 are also insulated as at 37 to minimize heat losses. A distinctive feature of the tunnel 34, as shown in Fig. 6, is the fact that the same is open ended and is devoid of shutters or doors. Loss of temperature within the tunnel is obtained by elevating the ends of the tunnel with respect to the main horizontal length thereof, so that the action of gravity is used in keeping the colder air of the tunnel within its lower portions. By omitting doors or gates from the ends of the tunnel, the ribbons of paper with the different meat cakes or pats thereon may be substantially continuously drawn through the refrigerating unit, this being accomplished without interruption in the further advancement of the materials.

The paper strip engages directly with the refrigerated bottom wall of the tunnel and the height of the tunnel is such that its refrigerated top wall is arranged but slightly higher than the top of the meat strip. Inasmuch as very low refrigerating temperatures are employed, the meat is quickly brought to a hard frozen state. In fact, the rate of linear advance of the meat through the tunnel and the temperatures of the latter are so correlated that within a period of five minutes, the desired frozen state of the meat is reached. It is also advantageous that the meat strip should travel on the paper ribbon. This avoids any tendency of the meat to adhere to the walls of the tunnel and, furthermore, the paper strip will not adhere to the frosted tunnel walls.

At the outlet end of the tunnel, there is provided a pair of superposed endless belts 38. These belts engage with the paper ribbons and with the meats contained thereon so as to cause the advancement of the same in a longitudinal direction through the various parts of the apparatus. The belts 38 pass over supporting wheels 39 which are driven by means of gearing, shown at 40, driven by the shaft 29. Upon discharge of the products from the belts 38, the same are immediately packed in cartons or boxes and stored under refrigerating temperatures. At the time of packing, the paper ribbon may be transversely severed at appropriate longitudinal intervals so that each section thereof may contain the desired number of meat pats. The fast freezing operation provided by the tunnel 34 preserves the freshness of the meat and its natural flavor during storage and shipment thereof in a manner well known in the art. The paper ribbon also serves as a sanitary measure, permitting the meat products to be handled without coming into direct contact with the hands of various operators.

In obtaining uniformity in weight of the individual cakes or pats, use is made of the gauge 25. This gauge, in the forms shown in Figs. 3 and 4, comprises an L-shaped member or bar which is slidably mounted in guides 41 provided on the outer surfaces of the head 4. It will be seen that as the gauge moves vertically, the height dimension or area of the outlet slots 5 will be varied. The vertical movement of the gauge is accomplished by the provision of a rock shaft 42 journaled horizontally in bearings 43 carried by the head 4. The shaft 42 is provided with one or more short crank extensions 44, the outer portions of which are received between fixed plates 45 provided on the rear surfaces of the gauge 25. To rock the shaft 42, the same is formed with an elongated upstanding arm 46, the upper end of which is bifurcated for the reception of a swiveled nut 47. The threaded bore of this nut receives the correspondingly threaded outer end of a shaft 48 which is driven by means of a reversible electric motor 49 and a speed reducing gearing 50. When the motor 49 is rotated in one direction, the gauge 25 is lowered to decrease the height dimension of the slots 5, and when the motor is rotated in an opposite direction, the gauge 25 is elevated to increase the height dimension.

Any suitable switch mechanism 51, subject to the action of the platform 23 of the weighing scale, may be used for controlling the energizing of the motor 49.

In view of the foregoing, it will be seen that the present invention provides a continuous method and apparatus for reducing ground meats and other equivalent food products to a frozen state. The freezing is of such character as to retain the original freshness, quality and taste of the meat products indefinitely, particularly when such products are retained, after packing, under refrigerating temperatures until the time of their use. Another advantage of the system is that of obtaining individual pats or steaks from the ground meat strips of uniform size and weight so that when such patties or steaks are sold in large quantities, uniform values are obtained, eliminating variations in this respect which now exist when the patties or steaks are individually formed by restaurant chefs prior to cooking the same.

While the invention has been described in its preferred embodiment, nevertheless, it will be understood that the same is subject to considerable variation and modification without departing from the spirit and scope of the following claim.

What I claim is:

Apparatus for preparing and refrigerating ground meat comprising: a frame, an extrusion cylinder adapted to receive a mass of ground meat, a head at one end of said cylinder having an outlet slot, means cooperative with said cylinder for forcing ground meat contained therein through said slot in order to reduce the meat to the form of a flat strip, guide devices carried by said frame over which a ribbon of paper is advanced longitudinally, said guide devices being disposed beneath the outlet slot of said cylinder and in registration therewith so that meat strips extruded from said cylinder are deposited on the paper ribbon, means carried by said frame for transversely scoring the meat strip moving on said ribbon into divisions of equal length, an elongated refrigerating tunnel, and means for drawing said ribbon with a meat strip deposited thereon through said tunnel.

LESLIE R. TANSLEY.